United States Patent [19]

Shiratani et al.

[11] Patent Number: 5,018,882
[45] Date of Patent: May 28, 1991

[54] APPARATUS FOR SUPPORTING ROTARY SHAFT IN VEHICLE TRANSMISSION

[75] Inventors: Takaaki Shiratani, Hiratsuka; Seiji Namba, Isehara, both of Japan

[73] Assignee: Nippon Seiko Kabushiki Kaisha, Tokyo, Japan

[21] Appl. No.: 561,441

[22] Filed: Aug. 1, 1990

[30] Foreign Application Priority Data

Aug. 10, 1989 [JP] Japan ................. 1-93428[U]

[51] Int. Cl.⁵ ............................................ F16C 33/78
[52] U.S. Cl. ........................................... 384/484
[58] Field of Search ........... 384/484, 488, 486, 482, 384/147, 148

[56] References Cited

U.S. PATENT DOCUMENTS

H749  3/1990  Nagashima ................. 384/484
4,505,484  3/1985  Ohkuma et al. ............. 384/486
4,605,319  8/1986  Korenhof .................... 384/484

FOREIGN PATENT DOCUMENTS 48-16413  5/1973  Japan.

Primary Examiner—Lenard A. Footland
Attorney, Agent, or Firm—Hedman, Gibson, Costigan & Hoare

[57] ABSTRACT

An apparatus for supporting a rotating shaft of a vehicle transmission with a roller bearing has a pair of seals which have an inner peripheral edge slanted toward and come very close to the end surface of the rollers of the roller bearing, whereby when the rotating shaft is tilted and inserted into the roller bearing, it is hard for the end of the rotating shaft to hit the seal on the opposite side from insertion.

4 Claims, 3 Drawing Sheets

APPARATUS FOR SUPPORTING ROTARY SHAFT IN VEHICLE TRANSMISSION

BACKGROUND OF THE INVENTION

1. Field of the Invention

This invention relates to an apparatus for supporting a rotary shaft installed in a vehicle transmission, specifically an apparatus used for freely rotatably supporting the rotary shaft with a casing of the vehicle transmission.

2. Description of the Prior Art

Provided inside a vehicle transmission are a plurality of rotating shafts for transmitting the drive force of an engine, each of which is freely rotatably supported by a roller bearing inside of the transmission casing.

FIGS. 5 and 6 show an example of this kind of apparatus for supporting a rotating shaft 1 in a vehicle transmission.

In order to transmit the drive force of an engine, a gear 2 is fixed to the radially outer peripheral surface of the rotating shaft 1 in an axially middle section of the shaft 1. The gear 2 meshes with a gear that is located on the outer peripheral surface of another rotating shaft that is not shown in the figure. Along with changing the speed between the two rotating shafts, the driving force of the engine is transmitted through the meshing gears.

A cylindrical roller bearing 4 having an outer race 5 is fitted into and fixed to a support section 3a inside of a transmission casing 3. Also an inner track 6 is formed on the radially inner peripheral surface of the outer race 5 in an axially middle section thereof, while an outer track is directly formed on the outer peripheral surface of the rotating shaft 1 (see FIG. 5). Provided between the inner track 6 of the bearing 4 and the outer track or the outer peripheral surface of the shaft 1 are a plurality of rollers 7, which makes it possible for the rotating shaft 1 to freely rotate and be supported inside of the support section 3a. In another example, the rollers 7 are also provided between the aforementioned inner track 6 and an outer track 17 which is located on the radially outer peripheral surface of an inner race 16 fixed to the rotating shaft 1 (see FIG. 6).

In actuality, as shown in FIG. 7, there is a pair of seals 8 which are located on the inner peripheral edges of the outer race 5 which forms the cylindrical roller bearing 4. The outer rim or radially outer peripheral edge of the seal 8 is supported by the side section of the outer ring 5. The seals 8 are of an O-ring shape and the inner rim or radially inner peripheral edge of the seals 8 comes in sliding contact with the outer peripheral surface of the rotating shaft 1 preventing any foreign objects from coming into a section where the rollers 7 are rolling.

As described above, in the conventional apparatus used for supporting the rotary shaft 1 in a vehicle transmission, ordinarily the cylindrical roller bearing 4 is first attached to the support section 3a inside of the casing 3. The rotating shaft 1 is then inserted on the inside of the roller bearing 4 either directly (FIG. 5) or with the inner race 16 supported on the rotating shaft 1 (FIG. 6).

When the rotating shaft 1 is inserted into the cylindrical roller bearing 4 attached on the inside of the support section 3a like this, the gear 2 located on the outer peripheral surface of the rotating shaft 1 in the middle section thereof comes close to the rotating support section 3a and, when inserting the rotating shaft 1 into the cylindrical roller bearing 4, gets in the way, so that the insertion area cannot be seen. As a result of this, it is easy for the rotating shaft 1 to tilt inside the rollers 7, and it becomes hard to line up and support the rotating shaft 1 concentrically with the outer race 5.

In the conventional apparatus for supporting the rotary shaft 1 with the cylindrical roller bearing 4 in the vehicle transmission as mentioned above, the distance L (FIG. 7) between the rollers 7 and the inner rim of the seals 8 is relatively large. Because of this, if the rotating shaft 1 is tilted when it is inserted into the roller bearing 4, either the edge of the rotating shaft 1 or the edge of the inner race 16 often hits the seal 8 on the opposite side (the right hand side of FIGS. 5 and 6) of the bearing 4 from where the shaft 1 is inserted and could damage the seal 8.

The apparatus for supporting the rotating shaft of a vehicle transmission of this invention is intended to solve this problem.

SUMMARY OF THE INVENTION

In the apparatus for supporting the rotating shaft of a vehicle transmission of this invention, the outer peripheral edges or outer rims of a pair of seals are supported by the inner peripheral edges of the aforementioned outer race and the inner peripheral edges or inner rims of the seals are slanted or bent toward the end surface of the rollers, so that the inner peripheral edges of the seals come very close to touching them. Accordingly, even when the rotating shaft is tilted and inserted into the roller bearing through the inner rim of one of the seals, it is hard for the end surface of the rotating shaft or the inner race on the rotating shaft to hit the inner rim of the other seal on the opposite side from insertion.

BRIEF DESCRIPTION OF THE DRAWINGS

These and other objects, features, and advantages of the present invention will become more apparent from the following description of the preferred embodiments taken in conjunction with the accompanying drawings, in which like reference numerals refer to same members throughout the drawings.

DETAILED DESCRIPTION OF THE PREFERRED EMBODIMENTS

Figure 1:
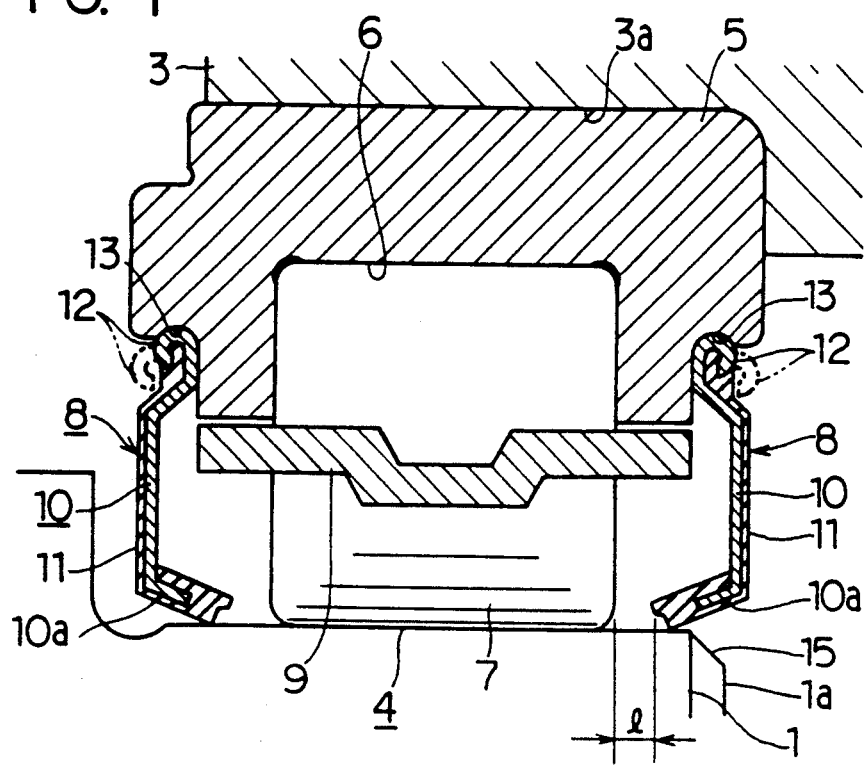
FIG. 1 shows a cross-sectional view of a part of the roller bearing used in a first example of this invention.
Figure 5:
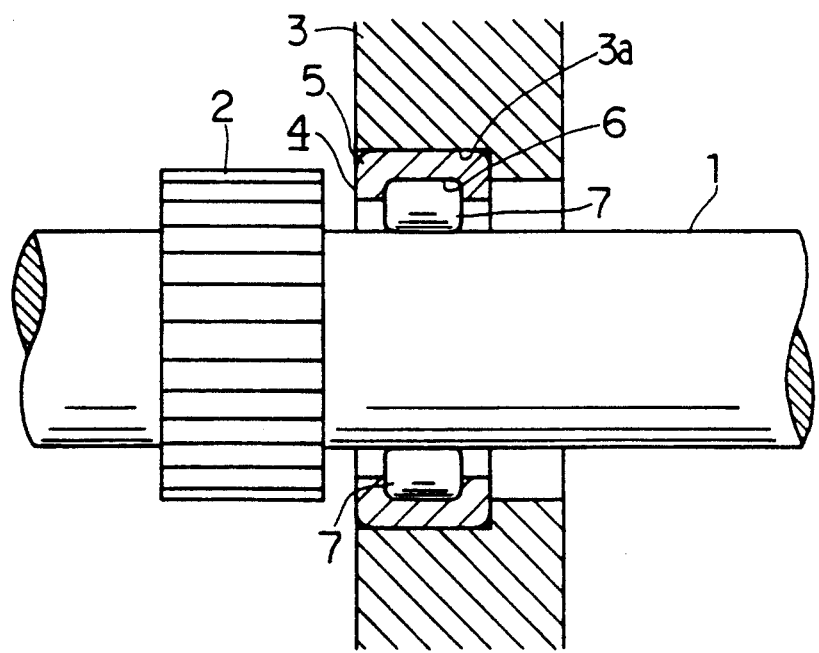
FIGS. 5 and 6 schematically show cross-sectional views of two examples of the apparatus for supporting the rotating shaft of an vehicle transmission to which this invention is applied.

In FIG. 1, in order to transmit the driving force from an engine having a casing 3, a rotating shaft 1 has a gear 2 fixed to a middle section of the shaft 1 (refer to FIG. 5). This rotating shaft 1 is freely rotatably supported by a cylindrical roller bearing 4 in a support section 3a located inside the casing 3.

The roller bearing 4 mentioned above is comprised of an outer race 5, a plurality of rollers 7 provided on the inside of the outer race 5 and a support means 9 for supporting the rollers 7. An inner track 6 is defined on the inside of the outer race 5 at a middle section thereof. The rollers 7 supported by the support means 9 have an outer peripheral surface in contact with the inner track 6. The inner peripheral edges of the outer race 5 of the roller bearing 4 on the opposed sides thereof support the outer rims or outer peripheral edges of a pair of O-ring seals 8. The inner rims or inner peripheral edges of these seals 8 come into slidable contact with the outer peripheral surface of the rotating shaft 1 and prevent foreign objects from getting into a section where the rollers 7 are rotating.

The seals 8 mentioned above are composed of a rubber member 11 and a core member 10 of metallic strip to reinforce the rubber member 11 while the outer race 5 is formed with a groove 13 on both inner peripheral edges thereof. The outer rim or outer peripheral edge of the core member 10 is curled outward making a support section 12. The seal 8 is subject to plastic deform from the shape indicated by a chain line to the shape indicated by a solid line and is fitted into the grooves 13 on both inner peripheral edges of the outer race 5, whereby each seal 8 is supported on the inside of outer race 5.

Figure 7:
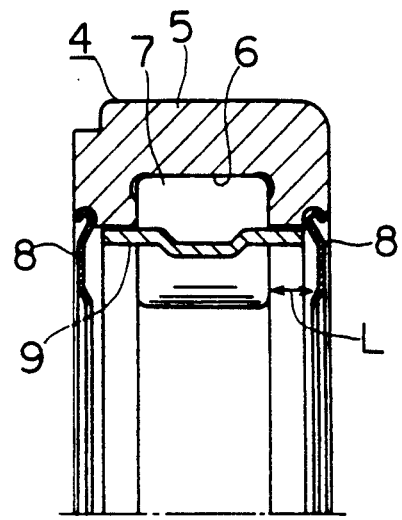
FIG. 7 shows a cross-sectional view of the roller bearing used in a conventional apparatus used for supporting the rotating shaft of a vehicle transmission.

The above configuration is substantially the same as that used conventionally in supporting apparatus for rotating shafts for vehicle transmission as in FIG. 7. However, in this example, the radically inner edge 10a of the core member 10 of seal 8 is bent or slanted toward the end surface of rollers 7. Also the rubber member 11 reinforced by the core member 10 is bent in the same direction as the radially inner edge 10a of the core member 10, so that the inner peripheral edge or inner rim of the rubber member 11 forming the seal 8 is brought close to the end surface of the roller 7.

The configuration of the apparatus for supporting the rotating shaft of a vehicle transmission in this invention functions in substantially the same manner as the conventional apparatus used for supporting the rotating shaft 1 of a vehicle transmission so as to freely rotatably support the rotating shaft 1 inside of the casing 3. In other words, the rotating shaft 1 is allowed to rotate in the rollers 7 which are rolling between the outer peripheral surface of the shaft 1 and the inner track 6 on the inner peripheral surface of the outer race 5 fixedly fitted into the support section 3a inside the casing 3.

In the case of the apparatus for supporting the rotating shaft of a vehicle transmission in this invention, the outer peripheral edge or outer rim of the seal 8 made of the rubber member 11 is supported by the inner peripheral edge of the outer race 5 on either side thereof, and the inner peripheral edge or inner rim of the rubber member 11 comes close to the end surface of the rollers 7. Because of this, when assembling the transmission, it makes it difficult for the end surface 1a of the rotating shaft 1 to hit and damage the inner rim of the rubber member 11 of the seal 8 at the opposite side from insertion even if the rotating shaft 1 is more or less tilted when it is inserted into the cylindrical roller bearing 4.

In an apparatus of this invention for supporting the rotating shaft of a vehicle transmission with the cylindrical roller bearing 4, the distance l (FIG. 1) between the inner peripheral edge of the rubber member 11 and the end surface of the rollers 7 is much smaller than the distance L in the conventional cylindrical roll bearing 4, for example that shown in FIG. 7 (l<L). Also, even if the rotating shaft 1 inserted into the rollers 7 is more or less tilted, the rotating shaft 1 desirably having the beveled edge 15 does not get out of place from the inner rim of the rubber member 11, so that the end surface 1a of the rotating shaft 1 does not hit the inner rim of the rubber member 11.

Because of this, even if the gear 2 located in a middle section of the rotating shaft 1 gets in the way and the place to insert the rotating shaft 1 can not be found, the inner rim of the rubber member 11 of the seal 8 has a very small chance of being damaged.

Figure 2:
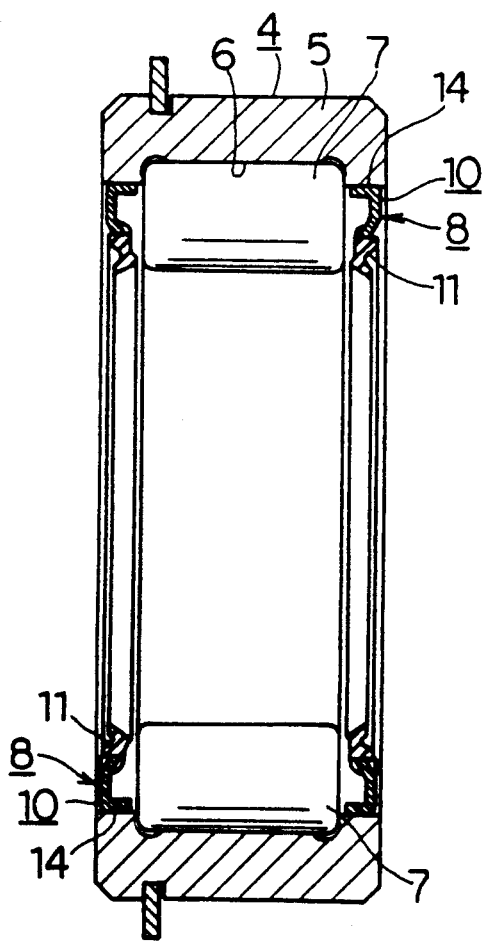
FIG. 2 shows a cross-sectional view of the roller bearing used in a second example of this invention.

FIG. 2 shows the second example of this invention. In this example, the seal 8 comprises a core member 10 and a rubber member 11. The core member 10 of the seal 8 is bent at the outer rim or outer peripheral edge 14 which is fixed to the inner peripheral surface of the outer race 5 on the opposed inner peripheral sides thereof.

The rubber member 11 in the middle section thereof is bent, so that the middle section is sticking out toward the rollers 7, and the outer rim or outer peripheral edge of the rubber member 11 is attached to the inner rim or inner peripheral edge of the core member 10.

The rest of the construction and functions of this example are substantially the same as for the first example.

Figure 3:
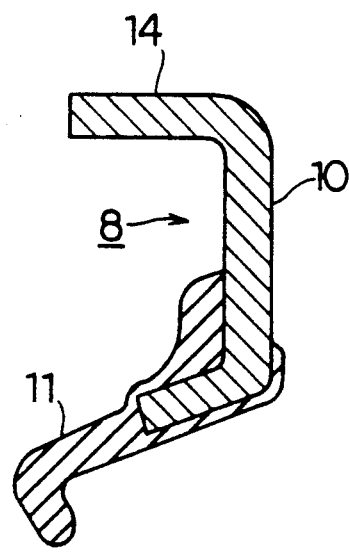
FIG. 3 shows a cross-sectional view of the seal used in a third example of this invention.

FIG. 3 shows the third example of this invention.

This example is an alteration of the second example mentioned above. It is different only in the cross sectional shape of the core member 10 and the rubber member 11 forming the seal 8. The rest is substantially the same as the second example above.

Figure 4:
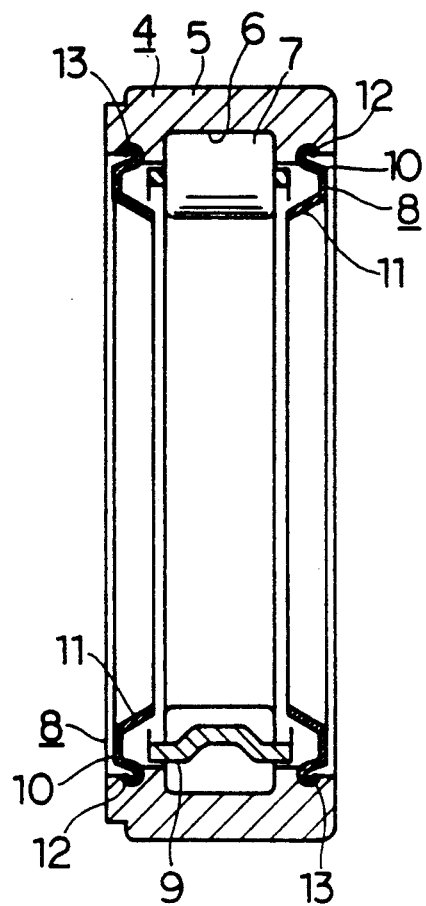
FIG. 4 shows a cross-sectional view of the roller bearing used in a fourth example of this invention.

Finally, in the case of the fourth example as shown in FIG. 4, a support section 12 is made by curling the outer rim or outer peripheral edge of the core member 10, and is attached to the engagement groove 13 on the inner peripheral edge of the outer race 5 on the both sides thereof. In this way, the core member 10 is supported by the inner peripheral edge of the outer race 5. On the inner rim or inner peripheral edge of the core member 10 is attached the rubber member 11 to make up the seal 8.

The rest of the configuration and functions of this example are substantially the same as those for the first to third examples.

Figure 6:
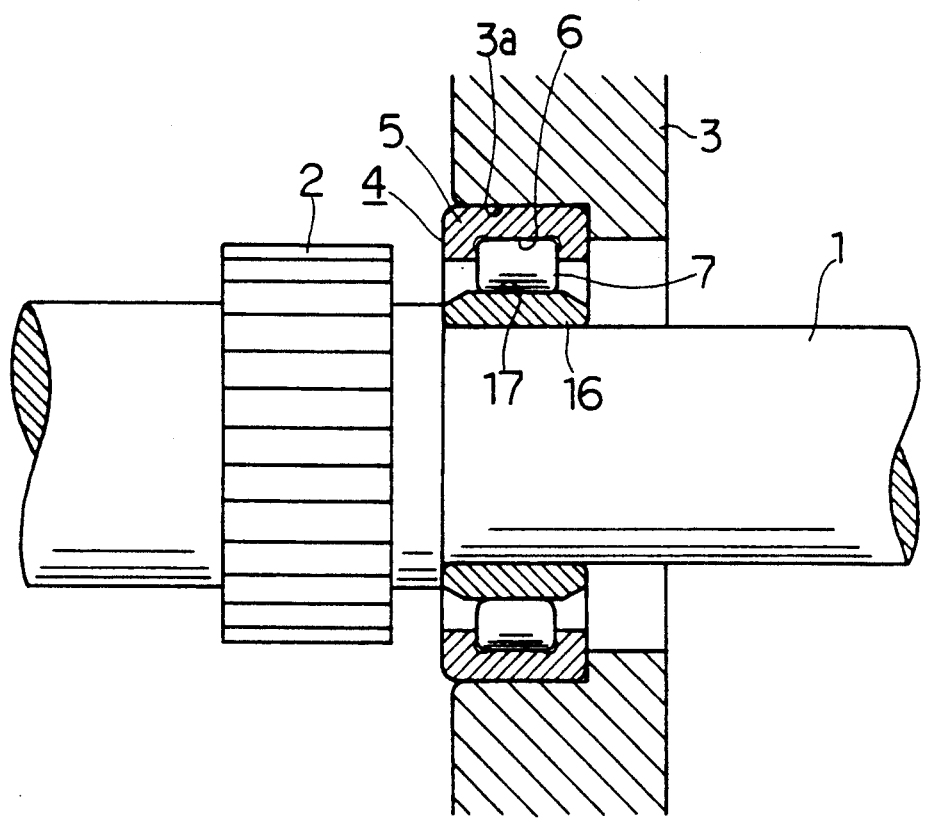

In each of the above examples, the outer peripheral surface of the rotating shaft 1 is used directly as the track for the bearings. However, the present invention is applied nearly in the same manner to the case where an outer race 16 is fitted on the outer surface of the rotating shaft 1 as shown in FIG. 6.

The apparatus of this invention for supporting the rotating shaft of a vehicle transmission helps prevent the end surface of the rotating shaft from hitting and damaging the radially inner peripheral edge or inner rim of the seal on the opposite side from the side where the shaft is inserted at the time of manufacture.

What is claimed is:

1. An apparatus for supporting a rotating shaft of a vehicle transmission, said vehicle transmission having a casing and a rotating shaft, said rotating shaft having an outer peripheral surface with an outer track provided on said outer peripheral surface, and an axially middle section with a gear secured on said outer peripheral surface at said axially middle section, said casing having a support section to which said rotating shaft is rotatably mounted near said gear, said apparatus comprising;

an outer race with an inner peripheral surface having axially middle and side sections and an inner track formed on said inner peripheral surface at said axially middle section, and outer race fixedly fitted into said support section of said casing;

a plurality of rollers with opposed end surfaces provided between said inner track of said outer race and said outer track provided on said outer peripheral surface of said rotating shaft;

a pair of seals comprised of a circular metallic core member with inner and outer peripheral edges and a circular elastic member with outer and inner peripheral edges, said outer peripheral edge of said elastic member supported by said outer peripheral edge of said metallic core member, and said outer peripheral edge of said metallic core member supported by said outer race along said inner peripheral surface thereof at said side sections; and each said seal having an inner peripheral edge which is bent toward said rollers, such that said inner peripheral edge of said elastic member comes close to said end surface of said rollers.

2. An apparatus of claim 1, wherein said rotating shaft has an inner race fitted thereon, and said inner race has an outer peripheral surface on which an outer track is provided.

3. An apparatus of claim 1, wherein said inner peripheral edge of said metallic core member is bent toward said end surface of said rollers, said outer peripheral edge of said elastic material integrally connected to said inner peripheral edge of said metallic core member, and said inner peripheral edge of said elastic material comes close to said end surface of said rollers.

4. An apparatus of claim 1, wherein said inner peripheral edge of said metallic core member is bent toward said end surface of said rollers, and said outer edge of said elastic material integrally connected to said inner peripheral edge of said metallic core member comprises a turning section between said inner and outer peripheral edges for connecting said inner and outer peripheral edges, said outer peripheral edge is directed toward said end surface of said rollers while said inner peripheral edge is directed in a direction opposite to that of said outer peripheral edge, so that said turning section comes close to said end surface of said rollers.

* * * * *